United States Patent
Sims

(10) Patent No.: US 6,748,682 B1
(45) Date of Patent: Jun. 15, 2004

(54) LICENSE PLATE MESSAGING SYSTEM

(76) Inventor: Bradford L. Sims, 500 Leon Sullivan Way, P.O. Box 1948, Charleston, WV (US) 25327

(*) Notice: Subject to any disclaimer, the term of this patent is extended or adjusted under 35 U.S.C. 154(b) by 0 days.

(21) Appl. No.: 10/358,907

(22) Filed: Feb. 4, 2003

(51) Int. Cl.⁷ .................................................. G09F 7/00
(52) U.S. Cl. .......................................... 40/210; 40/591
(58) Field of Search .......................... 40/210, 200, 591; D12/193, 169, 172

(56) References Cited

U.S. PATENT DOCUMENTS

| | | | | |
|---|---|---|---|---|
| 2,093,620 A | * | 9/1937 | Roessler | 40/210 |
| 2,135,191 A | * | 11/1938 | McBrady | 40/210 |
| 2,579,537 A | * | 12/1951 | Berlekamp | 40/210 |
| 2,880,535 A | * | 4/1959 | Bryant | 40/210 |
| 4,445,291 A | * | 5/1984 | Easley | 40/210 |
| 4,453,328 A | | 6/1984 | Connolly | 40/591 |
| 4,756,106 A | | 7/1988 | Foster | 40/591 |
| 4,955,153 A | | 9/1990 | Albrecht et al. | 40/661 |
| 5,077,925 A | * | 1/1992 | Herrera et al. | 40/591 |
| 5,266,144 A | | 11/1993 | Gaeto, Jr. | 156/306.6 |
| 5,622,389 A | | 4/1997 | Courtney | 283/81 |
| 5,652,565 A | * | 7/1997 | Salcedas et al. | 40/591 |
| 5,671,556 A | * | 9/1997 | Huntley | 40/200 |
| 5,813,154 A | | 9/1998 | Wilford | 40/618 |
| 5,878,516 A | | 3/1999 | Amirian | 40/591 |
| 6,238,122 B1 | | 5/2001 | Brooks et al. | 403/24 |
| 6,247,257 B1 | | 6/2001 | Powell | 40/591 |
| 6,253,476 B1 | | 7/2001 | Powell | 40/591 |
| 6,381,886 B1 | | 5/2002 | Chou | 40/209 |

* cited by examiner

*Primary Examiner*—Gary Hoge
(74) *Attorney, Agent, or Firm*—Steptoe & Johnson PLLC

(57) ABSTRACT

A system and method of incorporating a vehicle license plate into a larger, final message by attaching one or more message panels to all exterior of a motor vehicle, such as the bumper, in combination with a license plate of the motor vehicle. At least one message panel is attached to the exterior of the motor vehicle adjacent to a license plate. File message panels may be in sign, sticker, or magnet form and may be place before, alter above, and/or below the license plate. The message panels may have message panel background designs or additional text that continues the license plate background design and/or message. For example, a first message panel stating a global computer network address prefix, e.g., "www.", may be placed before a license plate while a second message panel stating a global computer network address suffix, e.g., ".com", may be placed after the license plate to convey a global computer network address to a viewer.

20 Claims, 1 Drawing Sheet

LICENSE PLATE MESSAGING SYSTEM

FIELD OF THE INVENTION

1. Field of the Invention

This invention relates generally to message panels placed on motor vehicle exteriors such as signs, magnets, or stickers, and more particularly, to message panels that interact or interrelate with license plates on motor vehicles.

2. Related Art

Bumper stickers and magnets, as well as other types of signs on motor vehicles that are secured to an exterior of a motor vehicle, have long been popular devices for conveying messages and advertisements to pedestrians and other drivers. Most commonly, signs are applied directly to bumpers with some form of adhesive, but a typical bumper sticker may be very difficult to remove and may cause damage to the surface of the bumper. Therefore, much of the prior art is dedicated to making removal or replacement of bumper stickers an easier endeavor.

For instance, U.S. Pat. No. 5,622,389 to Courtney claims a method of attaching bumper stickers to a mounting sheet that is then attached to a bumper using Velcro strips. This method allows for easy mounting and changing of bumper stickers causing minimal damage to the bumper. Likewise, U.S. Pat. No. 5,266,144 to Gaeto, Jr., U.S. Pat. No. 4,955,153 to Albrecht and U.S. Pat. No. 4,756,106 to Foster involve transparent plastic sleeves or open-faced sheaths that may be attached to a bumper for holding signs and messages. The signs or messages may be removed and replaced quickly with no damage to the under lying bumper.

In addition, some of the prior art is dedicated to making bumper signs and messages more visible to fellow motorists and pedestrians. U.S. Pat. No. 6,381,886 to Chou involves a sign or flag mounted directly to a license plate that extends outward from the body of the motor vehicle. This invention allows for increased viewing as well as easy interchangeability of signs and flags. U.S. Pat. No. 5,878,516 to Amiriani provides a means for attaching a message above a license plate by way of a frame for holding a sign attached to the vehicle by screws and brackets. Like the Chou patent, the invention allows for increased viewing and easy interchangeability. U.S. Pat. No. 4,453,328 to Connolly is another example wherein a flat surface for holding signs or messages is connected to a mounting element that extends outward from the vehicle.

The prior art also contains numerous other variations on the bumper sign theme. For instance, U.S. Pat. Nos. 6,253,476 and 6,247.257 to Powell involves signs hanging below a vehicle and affixed to a hitch by brackets. U.S. Pat. No. 6,238,122 to Brooks, on the other hand, involves a method of affixing a sign to a tailpipe using a ring-shaped bracket that fits around the tailpipe. Finally, U.S. Pat. No. 5,813,154 to Wilford involves interlocking magnetic or nonmagnetic pieces with words, letters or symbols printed on them, that may be arranged on a bumper to create unique messages. The invention also alleviates the problem of hard to remove bumper stickers.

While the prior art has focused on increasing the interchangeability and visibility of bumper signs, as well as easing their removal, all patented bumper and motor vehicle signs display their messages independent of the license plate. No prior art interacts or interrelates with what is stated on the license plate, e.g. a vanity license plate, to convey a greater message to other members of the public. Therefore, there is a need for a messaging system in which one or more signs, or bumper stickers, are placed on a motor vehicle exterior such that they interact with the license plate to create a larger message.

SUMMARY OF THE INVENTION

The present invention discloses a license plate message system that fills the gap found in the prior art by incorporating message panels in the form of signs, magnets, stickers and the like to expand on the terminology present in a vehicle license plate. Both standard license plates and vanity license plates may be used with the invention. One or more message panels may be used in combination with the license plate to create a message or advertisement. The message panels may be placed on the exterior of a vehicle, such as on a bumper or tailgate, in close proximity to the license plate, such as, above, below or on either side of the license plate.

BRIEF DESCRIPTION OF THE DRAWINGS

The present invention is described with reference to the accompanying drawing. In the drawing, the left-most digit of a reference number identifies the drawing in which the reference number first appears.

EMBODIMENTS OF THE INVENTION

Figure 1:
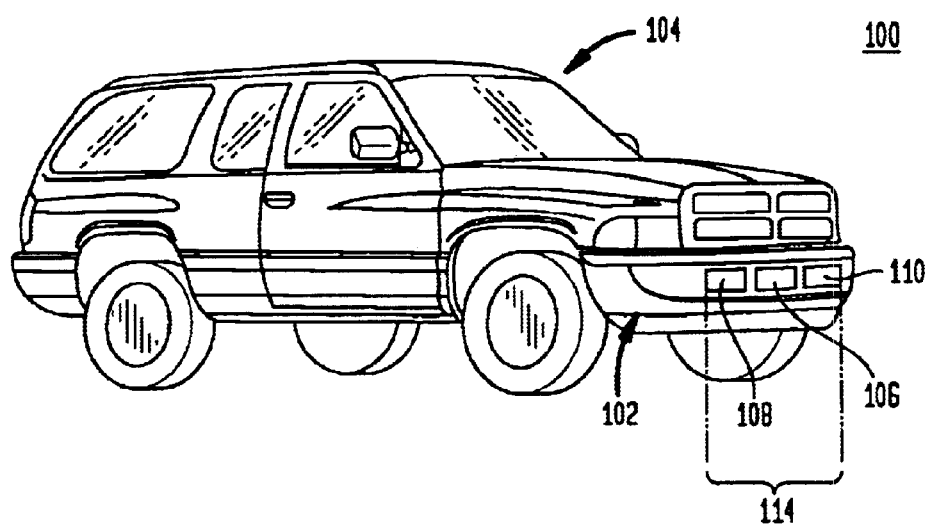
FIG. 1 is a perspective view of a vehicle incorporating the messaging system of the present invention.
Figure 2:
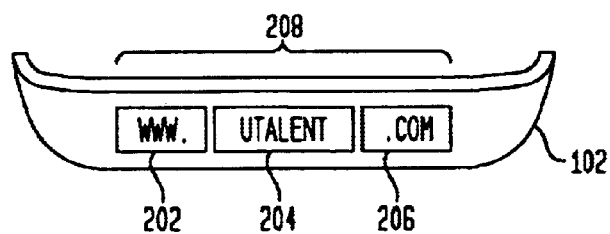
FIG. 2 is a front view of a vehicle bumper showing a message using the license plate messaging system of the present invention.

FIG. 1 shows the license plate messaging, system 100 of the present invention, whereas FIG. 2 shows a specific embodiment of the license plate messaging system 100. In the present invention, a first message panel 108 is secured to the exterior 112 of a motor vehicle 104, such as the bumper 102, adjacent to the license plate 106. The first message panel 108 may be positioned before, after, above, or below the license plate 106. The first message panel 108 is shown on the bumper 102 in front of the license plate 106 for convenience purpose only, wherein it would be obvious to place the first message panel 108 anywhere on the exterior 112 of the motor vehicle 104 adjacent to the license plate 106. The first message panel 108 is secured to the exterior 112 of the motor vehicle 104, e.g., bumper 102, by any conventional means: fasteners, a holder or framework, adhesive, or a magnet.

The first message panel 108 contains a first display item that consists of a design, logo, and/or text. In the preferred embodiment, the first display item is affixed to the first message panel 108 such that the removal of the first message panel 108 removes the first display item from the motor vehicle 104. However, in an alternative embodiment, the first display item may be removably attached to the first message panel 108, thereby enabling a user to easily and quickly remove one first display item and substitute another first display item therefor. Removably means for attaching include, but are not limited to, Velcro®, magnets, and holders in which the first display items slides into and out of.

The license plate 106 also contains a license plate display item that, at a minimum, contains text, that when it is a vanity plate, contains a short message. The license plate 106 also may have a design, logo, or background. Thus, when the first message panel 108 is secured to the exterior 112 of the motor vehicle 104 adjacent to the license plate 106, the combination of the first display item on the first message panel 108 with the license plate display item of the license plate 106 creates a final message 114. In addition, the design, such as a background design (mountains, lines, colors, animals, etc.), on the license plate display item of the license plate 106 may be on the first display item of the first message panel 108 as well, resulting in the design being continuous from the first message panel 108 to the license plate 106, or vice versa.

In another embodiment, a second message panel 110, having a second display item, is secured to the exterior 112 of the motor vehicle 104 such that the combination of the first display item of the first message panel 108, the license plate display item of the license plate 106, and the second display item of the second message panel 110 creates the final message 114. The second message panel 110 is shown in the figures as being attached to the bumper 102 of the motor vehicle 104 for convenience purpose only. It would be readily apparent to one of ordinary skill in the relevant art to secure the second message panel 110 (as well as the first message panel 108) to any portion of the exterior 112 of the motor vehicle 104.

Likewise, the second display item may contain a design or logo that is continued to the license plate display item of the license plate 106 and/or the first display item of the first message panel 108. For convenience only, the second message panel 110 is shown after the license plate 106. It would be readily apparent to one of ordinary skill in the art to place the second message panel 110, as well as the first message panel 108, anywhere adjacent to the license plate 106 in order to create the desired final message 114.

One specific embodiment is shown in FIG. 2 where the license plate display item is a vanity license plate 204 having the message UTALENT which is an abbreviation for a local business called UNITED TALENT. A first message panel 202 containing the text "www." is secured to the exterior 112, e.g., bumper 102, of the motor vehicle 104 before the license plate 204. A second message panel 206 is then secured to the exterior 112, e.g., bumper 102, of the motor vehicle 104 after the license plate 204. Therefore, the final message 208 created by the license plate messaging system 100 of the present invention is the global computer network domain address "www.utalent.com". Although not shown, the first message panels 202 and second message panel 206 may include a background design that resembles and corresponds to the background design of the license plate 204 in order to provide for continuity of design.

It is important to note that the present invention may be used with any number of message panels 108, 110. The use of a first message panel 106 with or without a second message panel 110 is for convenience purpose only. Depending on the final message 114 to be conveyed to the public, a user may incorporate any number of message panels 108, 110 secured to the exterior 112, e.g., bumper 102, of the motor vehicle 104 anywhere adjacent to the license plate 106 and/or each other in order to create the desired final message.

Conclusion

While various embodiments of the present invention have been described above, it should be understood that they have been presented by way of example only, and not of limitation. It will be understood by those skilled in the art that various changes in form and detail may be made therein without departing from the spirit and scope of the invention as defined. Thus, the breadth and scope of the present invention should not be limited by any of the above-described exemplary embodiments.

What is claimed is:

1. A license plate messaging system for creating a final message on an exterior of a motor vehicle using a license plate of the motor vehicle that contains a license plate display item, comprising:
   a first message panel having a first panel display item secured to the exterior of the motor vehicle adjacent to the license plate, wherein the combination of said first display item of said first message panel and the license plate display item of the license plate creates a final message.

2. The license plate message system according to claim 1, wherein said first message panel is secured to the exterior of the motor vehicle by a means for securing selected from the group consisting of a fastener, a holder, adhesive, and a magnet.

3. The license plate messaging system according to claim 1, wherein said first display item is selected from the group consisting of a picture, logo, design, and text.

4. The license plate messaging system according to claim 1, wherein said first display item contains a first background design and the license plate display item contains a second background design, wherein said first background design is a continuation of the second background design.

5. The license plate messaging system according to claim 1, further comprising:
   a second message panel having a second panel display item secured to the exterior of the motor vehicle adjacent to the license plate, wherein the combination of said first display item of said first message panel, said second display item of said second message panel, and the license plate display item of the license plate create said final message.

6. The license plate messaging system according to claim 5, wherein said second message panel is secured to the exterior of the motor vehicle by a means for securing selected from the group consisting of a fastener, a holder, adhesive, and a magnet.

7. The license plate messaging system according to claim 5, wherein said second display item is selected from the group consisting of a picture, logo, design, and text.

8. The license plate messaging system according to claim 5, wherein said first message panel is secured on the exterior of the motor vehicle before the license plate and said second message panel is secured on the exterior of the motor vehicle after the license plate.

9. The license plate messaging system according to claim 8, wherein said first display item of said first message panel contains the text "www." and said second display item of said second message panel contains the text ".com".

10. The license plate messaging system according to claim 1, wherein said first display item is removably attached to said first message panel.

11. The license plate messaging system according to claim 1, wherein said first message panel is secured to the exterior of the motor vehicle at a position before, after, above, or below the license plate.

12. The license plate messaging system according to claim 1, wherein the exterior of the motor vehicle is a bumper.

13. A method for creating a final message on an exterior of a motor vehicle using a license plate of the motor vehicle that contains a license plate display item and a message plate licensing system, comprising tile steps of:
   (a) securing a first message panel having a first panel display item to the exterior of the motor vehicle adjacent to the license plate, wherein the combination of said first display item of said first message panel and the license plate display item of the license plate create a final message.

14. The method according to claim 13, wherein said first display item is selected from the croup consisting of a picture, logo, design, and text.

15. The method according to claim 13, wherein said first display item contains a first background design and the license plate display item contains a second background design, wherein said first background design is a continuation of the second background design.

16. The method according to claim 13, further comprising the step of:
(b) securing a second message panel having a second panel display item to the exterior of the motor vehicle adjacent to the license plate, wherein the combination of said first display item of said first message panel, said second display item of said second message panel, and the license plate display item of the license plate create said final message.

17. The method according to claim 13, wherein said first message panel is secured on the exterior of the motor vehicle in said step (a) before the license plate and said second message panel is secured on the exterior of the motor vehicle in said step (b) after the license plate.

18. The method according to claim 17, wherein said first display item of said first message panel contains the text "www." and said second display item of said second message panel contains the text ".com".

19. The method according to claim 13, wherein said first message panel is secured to the exterior of the motor vehicle in said step (a) at a position before, after, above, or below the license plate.

20. The method according to claim 13, wherein said first display item is removably attached to said first message panel.

\* \* \* \* \*